O. A. ERDMANN.
TAIL LIGHT.
APPLICATION FILED MAY 2, 1914.
1,142,558.
Patented June 8, 1915.
2 SHEETS—SHEET 1.
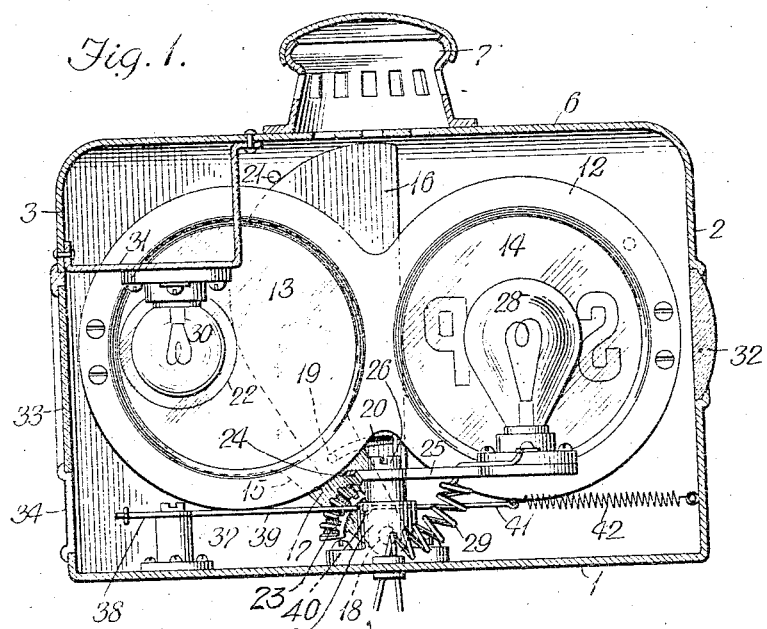
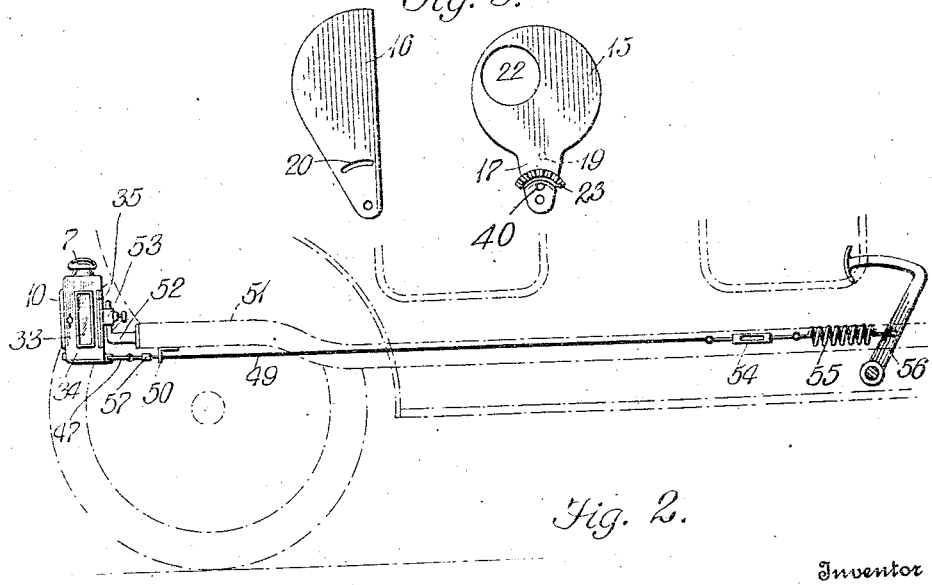
Inventor
Oscar A. Erdmann,
Witnesses
Chas. W. Stauffiger
Karl H. Butler
By
Attorney O. A. ERDMANN.
TAIL LIGHT.
APPLICATION FILED MAY 2, 1914.
1,142,558.
Patented June 8, 1915.
2 SHEETS—SHEET 2.
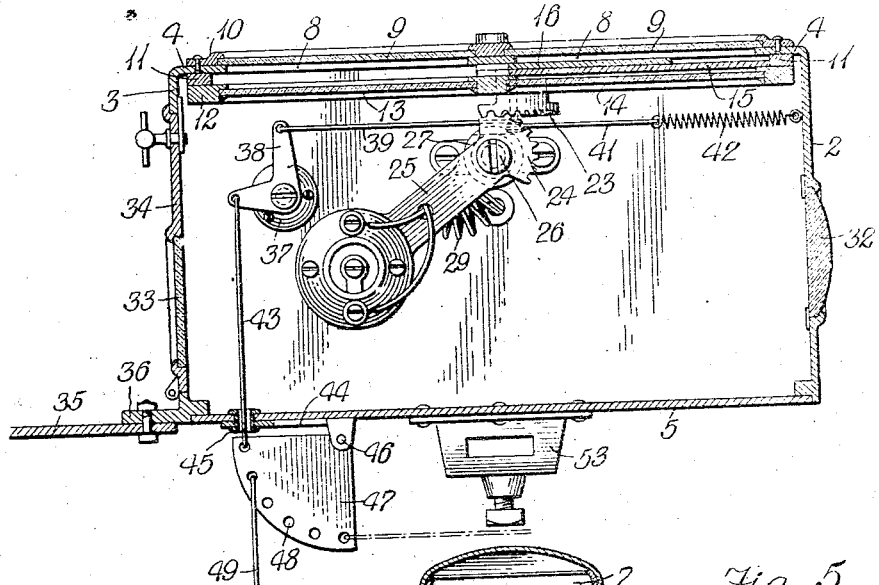
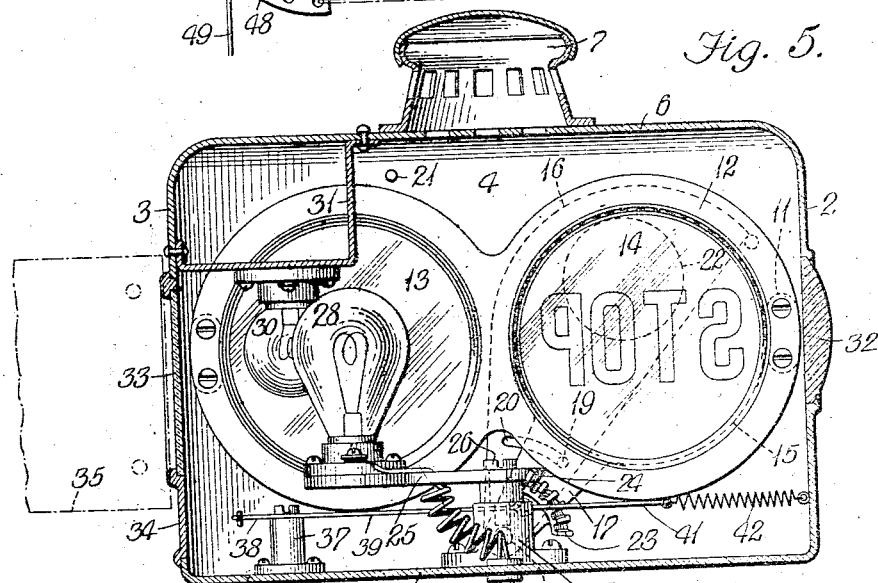
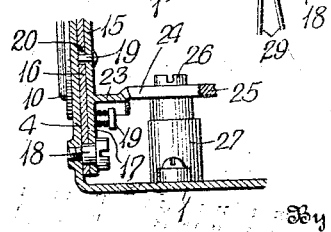
Inventor
Oscar A. Erdmann,
Witnesses
Chas. W. Stauffer
Earl H. Butler
By
Attorneys

UNITED STATES PATENT OFFICE.

OSCAR A. ERDMANN, OF DETROIT, MICHIGAN.

TAIL-LIGHT.

1,142,558.  Specification of Letters Patent.  Patented June 8, 1915.

Application filed May 2, 1914. Serial No. 835,836.

*To all whom it may concern:*

Be it known that I, OSCAR A. ERDMANN, a citizen of the United States of America, residing at Detroit, in the county of Wayne and State of Michigan, have invented certain new and useful Improvements in Tail-Lights, of which the following is a specification, reference being had therein to the accompanying drawings.

This invention relates to a tail lamp for automobiles and other vehicles, and the primary object of my invention is to provide a tail lamp embodying a novel signal adapted to prevent collisions in the day or night by a vehicle colliding with a preceding vehicle that stops or turns to one side.

Another object of this invention is to furnish a tail lamp with two main translucent plates and a shiftable lamp capable of casting rays of light through either plate, the shiftable lamp being movable with shutters that control the signals displayed by the tail lamp.

A further object of this invention is to provide a tail lamp embodying a novel signal that is instantly operated by an initial movement of a clutch pedal, throttle or controlling lever of an automobile or other vehicle, whereby the operator of a following vehicle will be signaled in sufficient time to prevent a rear-on collision.

A still further object of this invention is to provide a signal in connection with a tail lamp and simple and effective means for positively actuating the signal from the forward end of a vehicle.

With the above and other objects in view, the invention resides in the novel construction, combination and arrangement of parts to be hereinafter specifically described and then claimed, and reference will now be had to the drawing, wherein—

Figure 1 is a longitudinal sectional view of the tail lamp showing a stop and danger signal; Fig. 2 is a side elevation of a portion of an automobile equipped with the tail lamp, illustrating the actuating means of the signal of the lamp; Fig. 3 illustrates in elevation details of shutters forming part of the signal; Fig. 4 is a horizontal sectional view of the tail lamp; Fig. 5 is a longitudinal sectional view thereof showing the normal position of the signal, and Fig. 6 is a cross sectional view of a portion of the tail lamp.

The tail lamp comprises a rectangular casing having a bottom plate 1, end walls 2 and 3, a front wall 4, a rear wall 5, and a top plate 6 provided with a ventilating hood or dome 7. These elements can be stamped and pressed from sheet metal and assembled to form a rigid and durable structure.

The front wall 4 of the casing has two circular openings 8 closed by transparent plates 9 retained in engagement with the front wall 4 by frames or holders 10. The inner side of the front wall 4 has spacer blocks 11 and connected to said spacer blocks is a plate holder 12 provided with translucent plates 13 and 14. The former is red to indicate danger and the latter is green with the word "Stop" thereon. This word is prominently displayed, for instance, by making the characters of the word a frosted white in color permitting of rays of light rendering the same visible at a considerable distance.

Between the front wall 4 and the plate holder 12 are shutters 15 and 16, the former being circular and provided with a radially disposed arm 17 which arm is sector-shaped. These shutters are arranged in parallelism and the lower ends thereof loosely supported by a pin 18 mounted in the front wall 4 of the casing, as best shown in Fig. 6. The shutter 15, adjacent to the arm 17 has a pin 19 extending into a segment shaped slot 20 provided therefor in the sector shaped shutter 16, this pin and slot connection allowing the shutter 15 to be moved in advance of the shutter 16. After the shutter 15 is moved a prescribed distance, it picks up the shutter 16 by reason of the pin 19 engaging an end wall of the slot 20, and then said shutters moved in synchronism, assuming the position shown in Fig. 1, whereby a portion of the plate 13 is exposed through the opening 22 of the shutter 15. The shutters 15 and 16 are limited in movement in one direction by one of the spacer blocks 11 and in the opposite direction by the other spacer block and a stop pin 21, carried by the inner side of the front wall 4. The stop pin 21 is engaged by the sector shaped shutter 16, as shown in Fig. 1, and this shutter is held while the shutter 15 is shifted into parallel registration with the red plate 13. The shutter 16 is shaped to provide clearance for a small opening 22 in the shutter 15, whereby a portion of the plate 13, constituting a small red danger signal, will be simultaneously displayed with the stop signal. The shutter 16 covers the opening 22 of the shutter 15 when said shutters are in front of the plate 14.

The arm 17 of the shutter 15 has a sector rack 23 and meshing with said sector rack is a sector gear 24 forming the inner end of a horizontally disposed lamp holder 25 pivotally mounted, as at 26 upon a bearing 27 secured to the bottom plate 1 of the casing adjacent to the plate holder thereof. The lamp holder 25 is adapted to be swung in a horizontal plane and the outer end thereof has an incandescent lamp 28 adapted to be positioned to cast rays of light through either of the plates 13 or 14. Leading-in wires 29 are connected to the lamp 28, said wires extending from a suitable source of electrical energy through the bottom plate 1 of the casing and through the holder 25 in such a manner that said holder can be readily swung in a horizontal plane without any danger of the wires being broken.

In addition to the oscillatory lamp 28 there is a small stationary lamp 30 positioned to cast rays of light through the small opening 22 of the shutter 15 when said shutter is in parallel registration with the red danger plate 13. The lamp 30 is supported by a bracket 31 secured to the side wall 3 and the top plate 6 of the casing.

In addition to the plates 13 and 14 there is a lense or bulls-eye 32 carried by the side wall 2 and a transparent plate 33 carried by a door 34 forming part of the side wall 3. This transparent plate permits of rays of light being cast upon a license card, tag or sign detachably secured to a flange 36 or holder forming part of the casing.

Reference will now be had to the operating mechanism of the shutters 15 and 16 which is best shown in Figs. 2 and 4. Mounted upon the bottom plate 1 of the casing, contiguous to the side wall 3, is a post 37 and pivotally mounted upon the top of said post is a horizontally disposed bell crank 38. One end thereof is connected by a rod 39 to a pin 40, carried by the arm 17 of the shutter 15. This same pin is connected by a link 41 to an end convolution of a coiled retractile spring 42, said spring having the other end convolution thereof connected to the side wall 2 of the casing.

The bell crank 38 is connected by a rod 43 to a coupling member carried by the rear wall 5 of the casing. The coupling member is in the form of a swiveled and pivoted bell crank comprising a plate 44 having a tubular swivel connection 45 with the rear wall 5. Pivotally connected to an end of the plate 44, as at 46, is a bell or sector-shaped crank 47 provided with openings 48. The rod 43 extends through the tubular swivel 45 and is connected to the crank 47 at one of the openings 48 thereof. Another rod or cable 49 is connected to the crank 47 at another of the openings 48, said openings permitting of certain adjustments when necessary. As shown in Fig. 2, the rod or cable 49 extends through a guide or stop 50 carried by the frame 51 of an automobile or similar vehicle, said frame having a bracket or support 52 for a socket member 53 carried by the rear wall 5 of the lamp casing. The rod or cable 49 extends forwardly and is connected by a turnbuckle 54 and a coiled spring 55 to a clutch pedal 56, throttle or controlling lever of the automobile or vehicle. The turnbuckle 54 permits of adjustments being made and the spring 55 is of greater tension than the spring 42 within the lamp casing, whereby an initial movement of the clutch pedal 56 shifts the shutters 15 and 16. It is through the medium of the spring 55 that a further movement of the clutch pedal 56 is permissible without impairing the connections between said pedal and the shutters of the lamp. It is not until the clutch pedal 56 assumes its normal position that the coiled retractile spring 42 restores the shutters 15 and 16 to their normal position in parallel registration with the plate 14.

It is through the medium of the swiveled and pivoted crank 47 that suitable connections can be made between the shutters and the clutch pedal 56 irrespective of the position of the tail lamp, clutch pedal, throttle or controlling lever.

From the foregoing it will be observed that the lamp holder 25 is swung in an opposite direction from the shutters 15 and 16, and in this manner the main lamp or illuminating source is transferred from the red danger plate 13 to the "Stop" plate 14 when it is desired to display a "Stop" signal. This is all accomplished at the initial movement of the clutch pedal, thus making the display of a danger signal automatic and in sufficient time for the chauffer of a following automobile to avoid collision.

To prevent the shutter actuating mechanism within the lamp casing from being injured by an actuation of the clutch pedal 56, the rod or cable 49 is provided with an adjustable stop collar 57 adapted to engage the guide 50 of the frame 51 and hold the rod 49 while the clutch pedal 56 is shifted beyond the initial movement thereof. If necessary, this stop collar can be placed upon the rod 43 within the lamp casing to engage the rear wall 5.

It is thought that the operation and utility of my invention will be apparent without further description, and while in the drawings there is illustrated a preferred embodiment of the invention, it is to be understood that the structural elements are susceptible to such changes, as in the size, shape and manner of assemblage, as fall within the scope of the appended claims.

What I claim is:

1. In an automobile signal, illuminated plates, and shutters normally covering one of said plates and adapted to be shifted to expose one of said plates and a portion of another, and means for moving said shutters.

2. In an automobile signal, illuminated plates, and shutters normally covering one of said plates and adapted to be shifted to expose one of said plates and a portion of another, said shutters having a connection whereby one shutter is carried a prescribed distance from the other, and means for moving said shutters.

3. In a tail lamp, a casing, translucent plates carried thereby, illuminating means within said casing, shutters at said plates and normally covering one of said plates and adapted to be shifted to cover a portion of the other plate, and means actuated by a movement of said shutters to shift said illuminating means from one plate to the other.

4. In a tail lamp, a casing, translucent plates carried thereby, illuminating means within said casing, movable shutters at said plates and normally covering one of said plates, said shutters being arranged to move whereby one of said shutters moves in advance of the other and thereby exposes a portion of the other of said plates, and means actuated by a movement of said shutters to shift said illuminating means from one plate to the other.

5. In a tail lamp, a casing, translucent plates carried thereby, shutters movable at said plates and adapted to be shifted to expose one plate and a portion of another, and a lamp shiftable from one plate to the other.

6. In a tail lamp, a casing, translucent plates carried thereby, movable shutters covering one of said plates and adapted to be shifted to expose said plate and a portion of the other plate, a lamp shiftable from one plate to the other, and means for moving said lamp in an opposite direction to said shutters.

7. In a tail lamp, a casing, translucent plates arranged therein, movable shutters within said casing between said plates and the front wall of said casing and normally covering one of said plates, said shutters being arranged to move prescribed distances independent of each other whereby a portion of one of said plates is exposed, a lamp holder movable in said casing and adapted to swing a lamp from one plate to the other, and a connection between said lamp holder and said shutter whereby said shutters and said lamp holder can be actuated in unison.

8. In a tail lamp, a casing, translucent plates arranged therein, movable shutters at the front side of said plates and normally covering one of said plates, a lamp holder movable at the rear side of said plates and adapted to swing a lamp from one plate to another, and means for simultaneously moving said lamp holder in an opposite direction to said shutters.

9. In a tail lamp, a casing, translucent plates arranged therein, movable shutters at the front side of said plates and normally covering one of said plates, said shutters being arranged to move prescribed distances independent of each other whereby a portion of the other plate is exposed by a shutter, a lamp holder movable at the rear side of said plates and adapted to swing a lamp from one plate to another, and means for simultaneously moving said lamp holder and said shutters in opposite directions.

10. In a tail lamp, a casing, translucent plates arranged therein, movable shutters at the front side of said plates and normally held in front of one of said plates, a lamp holder movable at the rear side of said plates and adapted to swing a lamp from one plate to another, a connection between said shutters whereby one of said shutters can be shifted a prescribed distance independent of the other shutter to cover a portion of the other plate, and a connection between said shutters and said lamp holder whereby said shutters and said lamp holder can be simultaneously shifted in opposite directions.

In testimony whereof I affix my signature in presence of two witnesses.

OSCAR A. ERDMANN.

Witnesses:
 ANNA M. DORR,
 CHANTELLE DALDER.